R. E. WOODSON.
NUT CRACKING MACHINE.
APPLICATION FILED JUNE 22, 1916.
1,273,974.
Patented July 30, 1918.
4 SHEETS—SHEET 1.
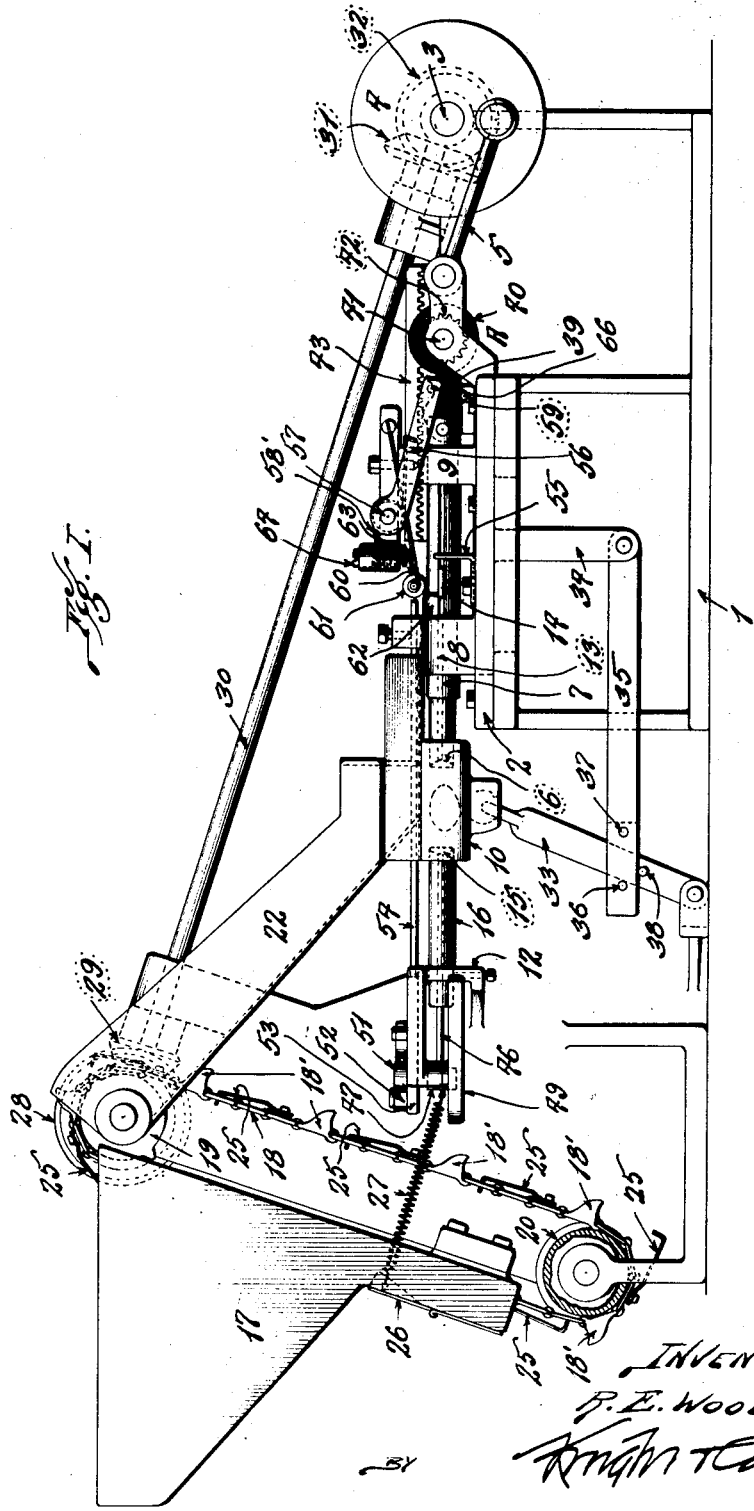

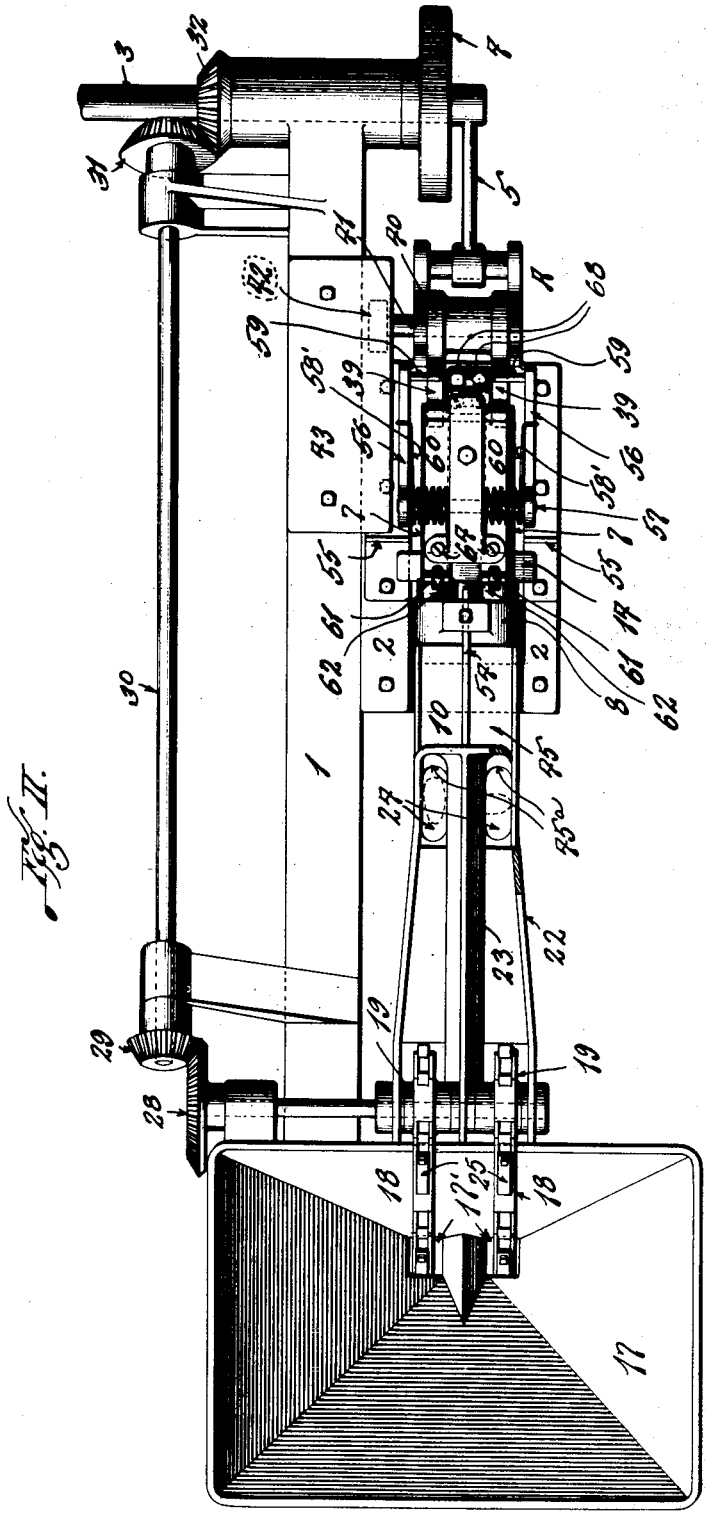

R. E. WOODSON.
NUT CRACKING MACHINE.
APPLICATION FILED JUNE 22, 1916.
1,273,974.
Patented July 30, 1918.
4 SHEETS—SHEET 3.
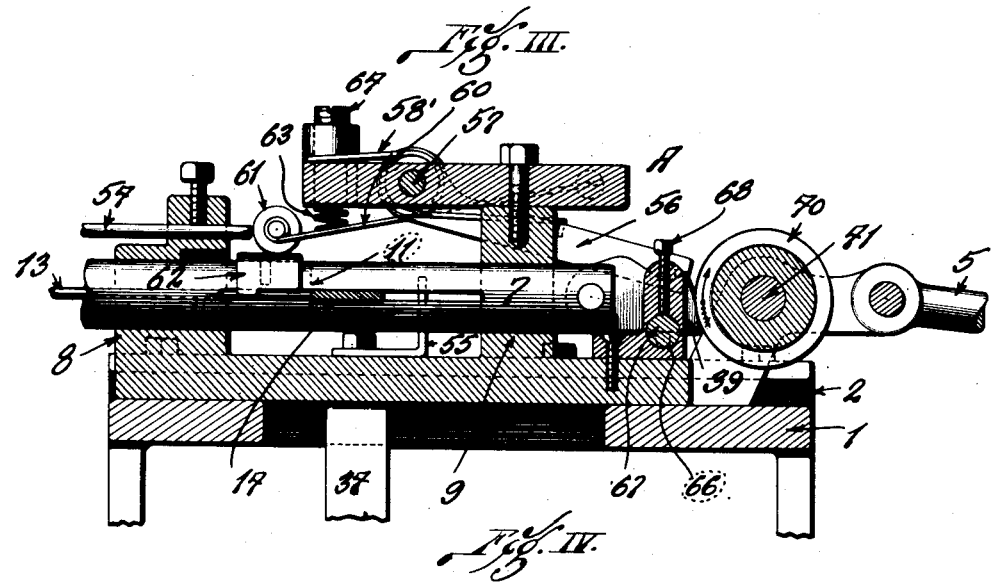
Fig. III.
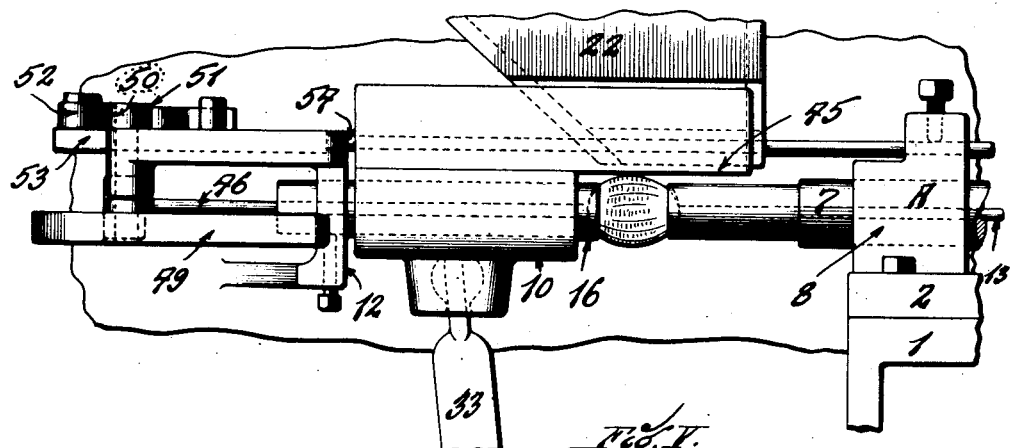
Fig. IV.
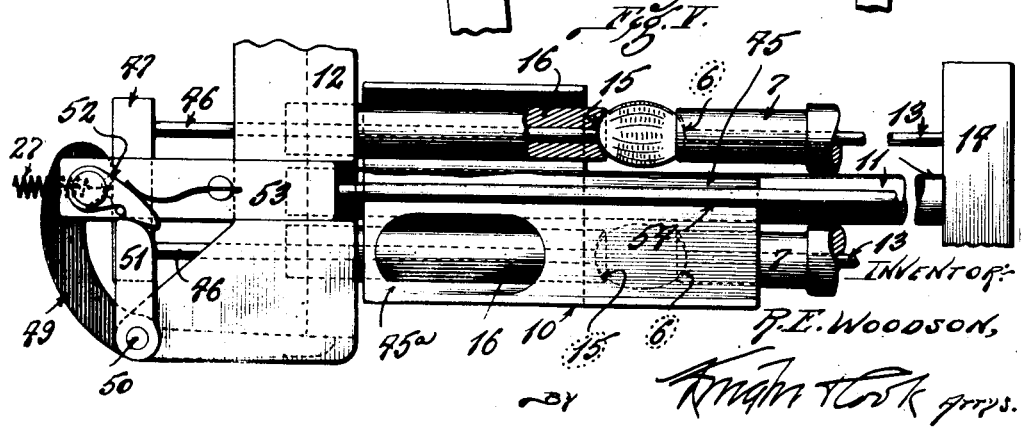
Fig. V.
INVENTOR:
R. E. Woodson,

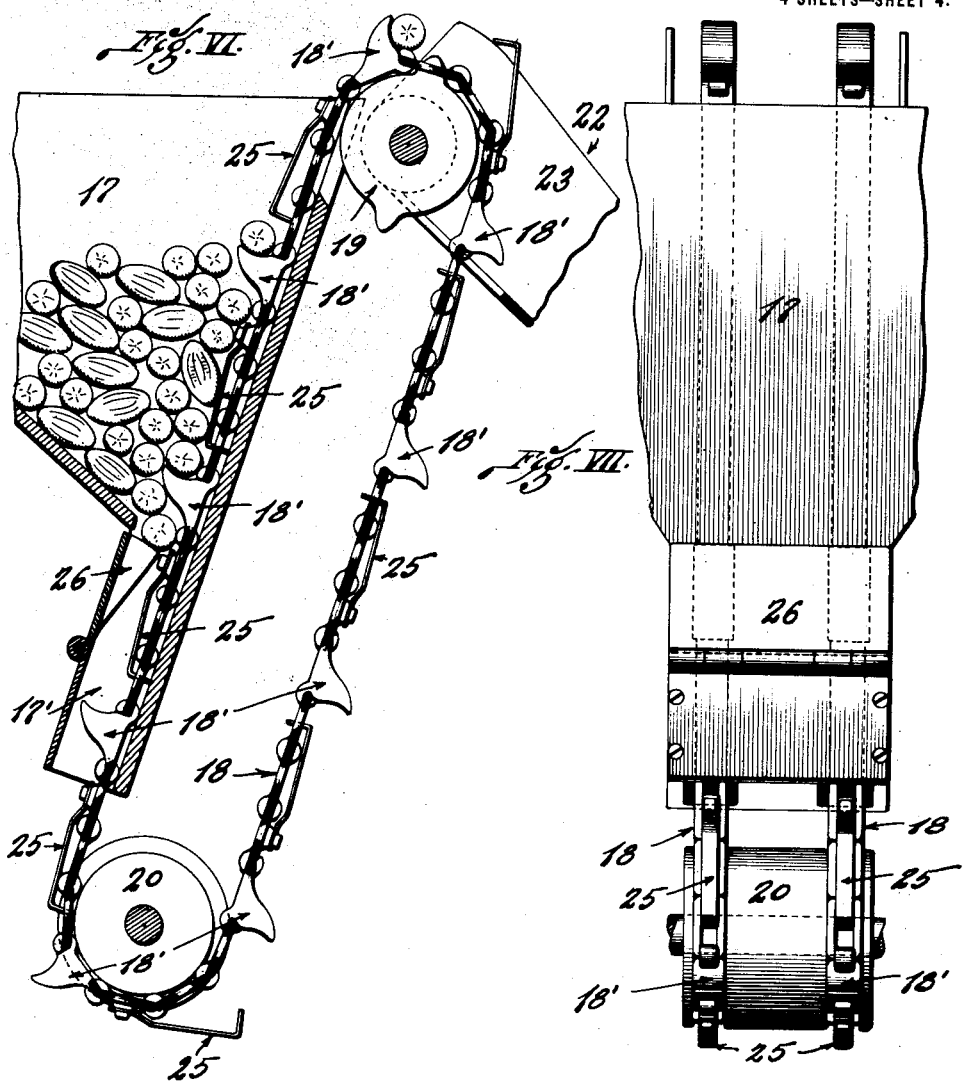
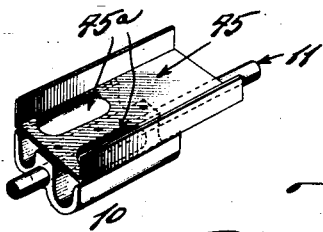

UNITED STATES PATENT OFFICE.

ROBERT E. WOODSON, OF ST. LOUIS, MISSOURI.

NUT-CRACKING MACHINE.

1,273,974.　　　　　Specification of Letters Patent.　　Patented July 30, 1918.

Application filed June 22, 1916. Serial No. 105,159.

*To all whom it may concern:*

Be it known that I, ROBERT E. WOODSON, a citizen of the United States of America, and a resident of the city of St. Louis, State of Missouri, have invented certain new and useful Improvements in Nut-Cracking Machines, of which the following is a full, clear, and exact description, reference being had to the accompanying drawings, forming a part of this specification.

My invention relates to improvements in nut cracking machines, one of the objects being to produce a simple and absolutely reliable compensating device associated with the cracking elements of a nut cracking machine to compensate for variations in the lengths of the nuts. Another object is to produce a simple and efficient means for feeding the nuts one at a time from a receptacle to a cracking device.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a side elevation of my nut cracking machine.

Fig. II is a top or plan view of the machine.

Fig. III is an enlarged fragmentary vertical section, taken approximately through the center of the reciprocatory carriage.

Fig. IV is an enlarged fragmentary side elevation showing a nut engaged with the cracking elements.

Fig. V is a plan view, partly in section, of parts shown in Fig. IV.

Fig. VI is an enlarged vertical section, illustrating the nut carrier and the nut receptacle.

Fig. VII is a rear view of the parts shown in Fig. VI.

Fig. VIII is a perspective view of the shuttle and the stationary rod on which it reciprocates.

1 designates a support provided with guides 2, in which a carriage A reciprocates. A power shaft 3 mounted in said support is provided with a crank disk 4 connected to the reciprocating carriage A by a pitman 5.

Cracking jaws 6 are formed at the ends of plunger rods or followers 7, the latter being slidably fitted to bearing lugs 8 and 9 on the carriage A.

A shuttle 10 (Figs. I, IV, V and VIII) is slidably mounted on a stationary rod 11 rigidly secured to a lug 12 on the support 1. The stationary rod 11 extends through the bearing lug 8 on the carriage A. Loosely supported ejector rods 13 are secured to a cross bar 14 which lies near the forward end of the stationary rod 11. The cross bar 14 extends into slots in the plunger rods 7, and the loosely supported ejector rods 13 are arranged in the plunger rods, for the purpose of dislodging fragments of nuts from the cracking jaws 6.

15 designates fixed cracking jaws formed on anvils or rods 16 opposing the cracking jaws 6. The rods 16 are adjustably secured to the supporting lug 12 by means of set screws.

The nuts to be cracked are introduced into a hopper 17 having a pair of openings or passageways 17' at its lower end, through which nut carriers 18 operate. Each nut carrier is preferably in the form of a sprocket chain passing around a drive wheel 19 and an idle wheel 20. Each nut carrier includes projecting nut holders 18' secured to the sprocket chains and adapted to traverse the passageways 17' of the hopper 17 to pick up the nuts and deliver them from the hopper to a chute 22, leading from the upper end of the hopper to the point at which the nuts are cracked. In the machine I have shown there are two nut carriers and two sets of cracking devices. The chute 22 is, therefore, divided into two passageways by a middle rib 23, and two discharge openings 24 are formed at the lower end of the chute, (Fig. II).

To prevent each of the nut holders 21 from delivering more than one nut at a time, ejector fingers 25 are secured to the sprocket chains 18. Each ejector finger is fixed at only one of its ends to a link of a chain 18, and provided with a free end which lies adjacent to one of the projecting nut holders 18'. As the nut holders travel upwardly through the mass of nuts in the receptacle 17, several nuts will usually be picked up and carried upwardly by each nut holder, but when the chain link to which an ejector finger is secured begins to travel on the drive wheel 19, the free end of the ejector finger will move across the path of the adjacent nut holder in a plane immediately above the nut resting thereon, so as to positively discharge the excess nuts therefrom. Each nut holder, therefore, discharges the nuts one at a time into the chute 22.

To prevent the nuts from escaping into or through the chain passageway 17' at the lower end of the receptacle 17, a yieldable nut retaining valve 26 is arranged in the said passageway. This valve is pivotally supported at its lower end and normally held in the position shown in Figs. I and VI, by means of a spring 27. The valve will yield freely to allow the projecting nut holders 18' to pass into the lower end of nut receptacle, thereafter returning to the position shown without allowing the nuts to enter the passageway 17'.

The drive wheels 19 (Figs. II and VI) are fixed to a drive shaft provided with a bevel gear 28 meshing with a pinion 29 on a shaft 30. A bevel gear 31, secured to the lower end of shaft 30, meshes with a bevel gear 32 on the power shaft 3.

The means for reciprocating the shuttle 10 comprises a lever arm 33, pivotally supported at its lower end and extending at its upper end into the shuttle. A leg 34, depending from the reciprocating carriage A, (Fig. I) is loosely connected to the lever arm 33 by a link 35, having pins 36 and 37, adapted to engage opposite sides of said lever arm 33. The link arm 35 preferably rests on a pin 38 carried by the lever arm.

39 designates thrust members pivoted to the plunger rods 7, and having free ends adapted to engage trip wheels or drive wheels 40, the latter being fixed to a rotatable shaft 41 carried by the carriage A.

42 designates a pinion meshing with a rack bar 43 fixed to the supporting frame 1. During the operation of the carriage A, the pinion 42 is rotated, due to its engagement with the fixed rack bar 43, and the drive wheels 40 are thus driven to impart a slight movement to the thrust members 39, as will be presently described.

In the operation of my machine, the nuts contained in the hopper 17 are picked up by the nut carriers 18 and delivered to the chute 22 through which they descend to the discharge openings 24, automatically adjusting themselves longitudinally of the chute during their descent. At this time the discharge openings 24 are closed by a closure plate 45 carried by the shuttle 10. During the forward movement of the shuttle, the closure plate 45 moves beyond the chute discharge openings 24, and the nuts then drop through inlet openings 45ª in the closure plate 45, falling into the shuttle, where they will lie longitudinally of the shuttle pockets. During the rearward movement of the carriage, the shuttle, and the plunger rods 7, carried by the carriage, move toward the stationary cracking jaws 16. The nuts are carried into engagement with the cracking jaws 16, and the shuttle and carriage continue to move rearwardly, thereby retaining the loosely supported nuts in engagement with the said cracking jaws, and permitting the ends of the nuts to become properly seated therein. The cracking jaws 6, on the plunger rods 7, engage the nuts, and immediately before the cracking thrust is imparted to the nuts the plunger rods are firmly forced toward the stationary cracking jaws, so as to firmly hold the nuts before they receive the final impulse. The means for accomplishing this comprises a pair of yieldable arms 60 secured to the reciprocating carriage A and provided at their free ends with rollers 61 which engage the plunger rods 7. Each plunger rod is provided with an abutment shoulder 62 adapted to be engaged by one of the rollers 61. Springs 63, engaging the arms 60, are mounted in pockets above said arms, and the force of said springs may be varied by adjusting the screws 64 which engage the upper ends of the springs. Immediately before the cracking operation, power is transmitted from the carriage A to the plunger rods 7, through the medium of the yieldable arms 60. At this time the rollers 61 engage the abutments 62 with the result of firmly seating the cracking jaws on the opposite ends of the nuts. A continued movement of the carriage will force the rotating drive wheels on trip wheels 40 into engagement with the free ends of the thrust members 39, thereby imparting the final thrust to the plunger rods 7.

It should be here stated that the thrust members 39 have a double function, serving as means to impart movement to the plunger rods 7 during nut cracking action with a final quick impulse movement in cracking the nuts, and the thrust members being so mounted that they are thrown out of action immediately following the cracking of the nuts, with the result of preventing mashing of the nuts between the jaws. To facilitate the nut cracking action I preferably make the thrust members of a form illustrated in Fig. I, so that there is provision for accelerated movement of the plunger rods 7 during the operation of the drive wheels 40 following the engagement of these drive wheels with the thrust members. The free end of each thrust member is nonconcentric with the axis of the thrust member, or in other words, the distance between the bottom of the free end of the thrust member and the axis of said member is greater than the distance between the top of said free end and the axis of the thrust member. Consequently, when the thrust member is engaged by the drive wheels corresponding thereto, as seen in Fig. I, there is provision for a forward thrust by the drive wheels against the thrust member, the force being communicated to the plunger rod to advance the jaw 6 toward the jaw 16.

Immediately after the cracking action the thrust member is thrown upwardly out of operative engagement with the drive wheel and the nut cracking action is discontinued at the proper time to obviate mashing of the nut.

When the nuts are cracked the shuttle and cracking jaws 7 occupy the position seen in Fig. IV and Fig. V, and the said parts then begin to move forwardly, permitting the cracked nuts to drop from the cracking jaws.

The nuts are positively ejected from the rigid or stationary cracking jaws by movable ejector rods 46, arranged in the stationary rods 16 and connected at their rear ends by a cross bar 47. The spring 27 forces the cross bar 47 into engagement with one end of a bell crank lever 49, the opposite end of said bell crank lever being engaged with the supporting lug 12. A pivot rod 50, fixed to the bell crank lever, is provided with a trip arm 51, operable by a spring pressed tripping pawl 52 carried by a slide bar 53, the latter being connected to the carriage by a long rod 54. When the carriage moves forwardly, after the cracking operation, the tripping pawl 52 engages and imparts movement to the trip arm 51 so as to move the bell crank lever 49. This action causes the cross bar 47 and ejector rods 46 to move forwardly to eject the nuts from the cracking jaws 15, and the tripping pawl 52 finally passes beyond the trip arm 51, permitting the spring 27 to restore the ejector rods 46.

During the return movement of the carriage the loosely supported ejector rods 13 are stopped when the cross bar 14 strikes the stationary abutment arms 55 extending upwardly from the guide bars 2. The plunger rods continue to move with the carriage and fragments of the nuts are discharged from said plunger rods by engaging the ends of the ejector rods 13. The plunger rods 7 are eventually stopped when the shoulders 62' (Fig. III) on the abutment members 62 strike the cross bar 14 while the latter engages the stationary arms 55. The carriage then moves rearwardly, independently of the plunger rods, thereby carrying the yieldable arms 60 to positions wherein their rollers 61 will lie in front of the abutments 62 on the plunger rods. During this part of the return movement of the carriage, the drive wheels or trip wheels 40 travel away from the pivoted thrust members 39, and the latter are then positively forced downwardly to their normal or starting position. The means for restoring the thrust members 39 comprises a pair of spring arms 56, pivotally connected to the carriage by means of a single pin 57, and provided at their free ends with pins 59 which rest upon the thrust members 39. Springs 58' force the arms 56 downwardly and thereby tend to force the thrust members 39 to the position shown in Figs. I and III wherein the thrust members lie in an angular position relative to the axis of the trip wheels 40.

The downward movements of the thrust members are limited by abutment pins 66 projecting from eccentrics 67, said eccentrics being rotatably mounted on the carriage so that they may be adjusted to locate the abutment pins 66 at different elevations. 68 designates set screws for preventing the eccentrics 67 from turning after they have been adjusted to the desired positions. By adjusting the eccentrics 67, the starting positions of the thrust members may be varied to obtain the desired cracking movement.

I claim:—

1. In a nut cracking machine, an anvil, a follower alined therewith and normally spaced therefrom, means for moving the follower toward the anvil, a segmental block carried by the follower at the end remote from the anvil, a rotatable member in line with the segmental block, and a spring engaging the segmental block and constraining it toward angular relation to the rotatable member.

2. A nut cracking machine comprising a plurality of associated anvils, a corresponding plurality of followers alined with the anvils and normally spaced therefrom, a slide carrying the followers, means for moving the slide and followers bodily toward the anvils, elastic means between the followers and slide for permitting movements of the followers irrespective of the slide, a segmental block carried by each follower at the end remote from the anvil, a rotatable member in line with each segmental block, a spring engaging each segmental block and constraining it to angular relation to the respective rotatable member, a common carrier for the springs mounted on the slide, and means for causing rotation of the rotatable members by movements of the slide.

3. In a nut cracking machine, a plurality of associated anvils, a corresponding plurality of followers alined with the anvils and movable toward and from the latter, a segmental block carried by and pivoted to each follower at the end remote from the respective anvil, a rotatable member in line with each segmental block and adapted to engage the block and move it about its pivotal connection with the follower, a spring engaging each segmental block and constraining it to angular relation to the respective rotatable member, a common carrier for the springs, and means for causing rotation of the rotatable members.

4. In a nut cracking machine, a cracking device having a reciprocating cracking plunger, means for actuating said cracking plunger, said means including a thrust member carried by said cracking plunger, a rotatable trip member adapted to engage and actuate said thrust member during the cracking operations, said thrust member being movable to an inoperative position in response to movements of said rotatable trip member, and a yieldable device for restoring said thrust member to its operative position.

5. In a nut cracking machine, a cracking device, a receptacle for the nuts to be cracked and means for feeding the nuts from said receptacle to said cracking device, said means including a nut carrier provided with a nut holder, a nut ejector carried by said nut carrier, and means for actuating said nut ejector to discharge the excess nuts from said nut carrier.

6. In a nut cracking machine, a cracking device, a receptacle for the nuts to be cracked and means for feeding the nuts from said receptacle to said cracking device, said means including a nut carrier provided with a nut holder, a nut ejector carried by said nut carrier at a point adjacent to said nut holder, and means for shifting said nut ejector into the path of said nut holder to discharge the excess nuts therefrom.

7. In a nut cracking machine, a cracking device, a receptacle for the nuts to be cracked and means for feeding the nuts from said receptacle to said cracking device, said means including a nut carrier provided with a nut holder, a nut ejector secured to said carrier and provided with a free portion which lies adjacent to said nut holder, and means for actuating said carrier and nut ejector to locate the free portion of said ejector in the path of said nut holder, thereby discharging the excess nuts from said nut holder.

8. In a nut cracking machine, a cracking device, a receptacle for the nuts to be cracked, and means for feeding the nuts one at a time from said receptacle to said cracking device, said means including a nut carrier arranged to move upwardly from the nuts in said receptacle, said nut carrier having a nut holder whereby the nuts are picked from said receptacle, a nut ejector carried by said carrier at a point above said nut holder, and means for moving said nut ejector relative to said nut holder to discharge the excess nuts from said nut holder.

9. In a nut cracking machine, a cracking device, a receptacle for the nuts to be cracked, and means for feeding the nuts one at a time from said receptacle to said cracking device, said means including a flexible endless nut carrier arranged to travel upwardly from the nuts in said receptacle, said nut carrier having a nut holder whereby the nuts are picked from said receptacle, an ejector member secured to said nut carrier and provided with a free portion which lies adjacent to said nut holder, and a driving device for moving said nut carrier in an endless path so as to turn said nut carrier at a point beyond the mass of nuts in the receptacle, thereby moving the free portion of said ejector member into the path of the nut holder at a point adjacent to the nut resting thereon, so as to discharge the excess nuts from the nut carrier.

10. A nut cracking machine having a cracking device, a receptacle for the nuts to be cracked, a nut feeder comprising a nut carrier passing through said receptacle to pick the nuts therefrom, said receptacle having an opening for the reception of said nut carrier in a plane below the nuts, and a nut retaining device arranged at said opening to prevent the escape of nuts therethrough.

11. A nut cracking machine having a cracking device, a receptacle for the nuts to be cracked, a nut feeder comprising a nut carrier passing through said receptacle to pick the nuts therefrom, said receptacle having an opening for the reception of said nut carrier in a plane below the nuts, and a yieldable nut retaining valve arranged at said opening to prevent the escape of nuts therethrough, said nut carrier being provided with projecting nut holders adapted to open said valve and pass through said opening.

12. In a nut cracking machine, a cracking device having a reciprocatory cracking plunger, means for actuating said plunger, said means including a thrust member pivoted to said plunger, a rotatable trip member adapted to actuate said thrust member during the cracking operations, and an adjustable stop device for varying the movements of said thrust member, said adjustable stop device comprising an eccentric provided with an abutment on which said thrust member normally rests, and means for retaining said eccentric in the positions to which it may be adjusted.

13. In a nut cracking machine, a cracking device having a reciprocatory cracking plunger, means for actuating said plunger, said means including a thrust member pivoted to said plunger, a rotatable trip member adapted to actuate said thrust member during the cracking operations, and an adjustable stop device for varying the movements of said thrust member, said adjustable stop device comprising an adjustable eccentric provided with a projection on which said thrust member normally rests, and a screw threaded device fitted to said eccentric to secure it in the positions to which it may be turned.

14. In a nut cracking machine, a cracking device including a reciprocatory carriage, a cracking plunger arranged to reciprocate on said carriage, and a power transmission device comprising a yieldable arm secured to said carriage and engaging said cracking plunger, said cracking plunger being provided with an abutment adapted to be engaged by said yieldable arm before each cracking operation.

15. In a nut cracking machine, a cracking device including a reciprocatory carriage, a cracking plunger arranged to reciprocate on said carriage, and a power transmission device comprising a yieldable arm secured to said carriage and provided at one end with a roller which engages said cracking plunger, said cracking plunger having an abutment shoulder adapted to be engaged by the roller of said yieldable arm immediately before each cracking operation.

ROBT. E. WOODSON.